Patented Apr. 4, 1950

2,502,678

UNITED STATES PATENT OFFICE 2,502,678

METHOD FOR PREPARING ACRYLONITRILE BY VAPOR PHASE CATALYTIC REACTION OF ACETYLENE AND HYDROGEN CYANIDE

David C. Spaulding, Cuyahoga Falls, and Charles E. Brockway, Akron, Ohio, assignors to The B. F. Goodrich Company, New York, N. Y., a corporation of New York No Drawing. Application August 21, 1948, Serial No. 45,577

5 Claims. (Cl. 260—465.3)

This invention relates to a method for the preparation of acrylonitrile and pertains more specifically to the preparation of acrylonitrile by the vapor phase catalytic reaction of acetylene and hydrogen cyanide.

It is well known that acrylonitrile can be prepared by the direct single step reaction of acetylene and hydrogen cyanide. This reaction has been carried out in a large number of ways, for example, by a liquid phase reaction or by a vapor phase reaction over a contact-type catalyst. Many types of catalysts, including alkali and alkaline earth metal cyanides, salts and oxides of zinc, cadmium and magnesium and the like, have been proposed for use in the vapor phase reaction, and it has been proposed that the catalyst be deposited on a support such as alumina, calcium sulfate, pumice, graphite, beryl, and various refractory materials.

However, none of the above catalysts or catalyst combinations, either supported or unsupported, has proven entirely satisfactory, because either the production rate, the conversion, or the yield of acrylonitrile has been too low to warrant commercial use of a single step process. As a result, costly and more complicated methods for acrylonitrile preparation (such as reacting ethylene oxide with hydrogen cyanide to form ethylene cyanohydrin, which is then dehydrated to acrylonitrile) have been employed commercially.

We have now discovered, however, that acrylonitrile may be obtained economically in substantially theoretical yields and excellent conversions by a single step, vapor phase reaction of acetylene and hydrogen cyanide, by passing the reactants over a catalyst support impregnated with an alkali metal hydroxide catalyst and a catalyst promoter consisting of barium in the form of a barium compound. The added advantage of long catalyst activity is also obtained by the use of the barium promoter in combination with the alkali metal hydroxide catalyst. The use of barium as a catalyst promoter also permits the attainment of outstandingly high space velocities (ratio of volume of gases per hour at standard conditions of temperature and pressure to the volume of catalyst) and consequently high production rates are obtained.

The reason for the surprisingly beneficial effect obtained by the use of a barium catalyst promoter is not definitely known, but is believed due to the fact that catalyst support materials generally contain impurities such as metals, and especially sulfur compounds, which tend to have a poisoning effect on the catalyst, and that the barium either renders the impurities inactive or reacts with them to form compounds which have no harmful effect on the alkali metal hydroxide catalyst or on the reactants.

The barium promoter may be deposited on the support in the form of any of its compounds, but, for ease of application and for reasons of economy, the barium is preferably applied in the form of its water-soluble compounds such as barium chloride, barium acetate, barium nitrate, barium iodide, barium cyanide and the like. It is desirable that the amount of the barium compound be from 0.5% to 4% and especially from 1 to 2% (calculated as barium and based on the weight of support), although smaller or larger amounts may be used with but little decrease in production rate.

The catalyst which is used in accordance with this invention is a hydroxide of any of the alkali metals, that is, the monovalent metals of the first group of the periodic table which include lithium, sodium, potassium, rubidium, and cesium, with sodium hydroxide being the preferred catalyst. The alkali metal hydroxide may be deposited on the catalyst support in any desired amount, but highest yields of acrylonitrile are obtained when from 3 to 15% (and especially 6 to 10%) by weight (based on the weight of the catalyst support) of the hydroxide is used.

It is important that the support upon which the alkali metal hydroxide catalyst and the barium compound catalyst promoter are deposited be one which will not react with the catalyst, catalyst promoter, or with the hydrogen cyanide or acetylene, that is, that it be inert toward the reactants, and further that the support not decompose or sinter at the high temperatures at which the reaction is conducted. Because they possess these properties and because they are inexpensive and are therefore adapted to use in a commercial process, the carbonaceous materials are the most desirable catalyst supports. Included among these materials are wood and vegetable charcoals, bone charcoal, coke, coal, graphite and the like. The preferred catalyst support from among the carbonaceous materials is an unactivated hardwood charcoal commonly known as "chicken charcoal" and which is in the form of particles which are approximately $\frac{1}{8}''$ to $\frac{1}{4}''$ long and $\frac{1}{8}''$ in diameter. The catalyst support may also be extracted with acids and/or bases to remove certain impurities which are frequently present in carbonaceous supports.

Improved yields of acrylonitrile are also obtained when other catalyst supports are impregnated with an alkali metal hydroxide catalyst and a barium compound although the yields are not as good as those obtained when carbonaceous supports are utilized. Among the other supports which may be used are included activated alumina, diatomaceous earths, ceramic materials and the like. Thus, outstandingly superior results are obtained with any of the common catalyst supports so long as an alkali metal hydroxide catalyst with a barium catalyst promoter is used.

The supported catalyst and catalyst promoter are best prepared by mixing together the catalyst support and an aqueous solution of a barium compound, which solution contains the desired percentage of barium (based on the weight of the support), heating the resulting mixture to the boiling point, cooling and then filtering to remove the water. The wet material is heated at elevated temperatures until dry. The dried material is then mixed with a water solution containing the desired amount of an alkali metal hydroxide (based on the weight and wet takeup of the support) and the heating, cooling, filtering and drying process repeated whereupon the supported catalyst material is in condition for use.

From the foregoing it is seen that the particularly preferred supported catalyst and catalyst promoter for the reaction of acetylene and hydrogen cyanide in accordance with this invention comprise a carbonaceous support impregnated with 6 to 10% of an alkali metal hydroxide and from 1 to 2% of barium (in the form of a barium salt).

When other catalytic materials such as alkali metal cyanides, magnesium and zinc oxides, alkali earth metal carbonates and the like are substituted for the alkali metal hydroxide employed in the invention, lower yields and conversions are obtained. For example, when a mixture of sodium and potassium cyanide is substituted for the alkali metal hydroxide, the production rate obtained is only 20% of that obtained with the preferred catalyst and catalyst promoter of this invention, thus indicating that the most effective catalyst for use with the barium promoter is the alkali metal hydroxide. Accordingly, when a substantial amount of the alkali metal hydroxide has been converted to the cyanide by reaction with the hydrogen cyanide, a decrease in yield of acrylonitrile occurs, making it desirable to replace the catalyst which has been converted. However, the reaction may be carried out for long periods before sufficient conversion to the cyanide takes place to necessitate replacing the catalyst.

In carrying out the reaction of acetylene with hydrogen cyanide the supported catalyst and catalyst promoter are packed in a reactor tube which may be made of glass or ceramic material and preferably of stainless steel, although other materials may also be used. The air is then removed from the reactor tube by passing a current of an inert gas such as nitrogen or helium through the tube. The tube is then heated to a temperature in the range of 500° to 675° C. while the gaseous reactants, acetylene and hydrogen cyanide, which are desirably preheated to a temperature near that of the supported catalyst and catalyst support, are introduced into the reactor tube (preferably in a vertical downward flow to prevent small amounts of higher boiling products from refluxing downward onto the supported catalyst and catalyst promoter), whereupon reaction occurs very rapidly to form acrylonitrile.

The molal ratio of the reactants is not critical and may be varied widely. Preferably, an excess of acetylene is used and a ratio of 1.5 to 2.0 moles of acetylene for each mole of hydrogen cyanide has been found to give the highest yields of acrylonitrile, although from 1 mole to 10 moles or even more of acetylene for each mole of hydrogen cyanide are operative. In order to insure the passage of the reactants through the reactor tube and to aid in accurately controlling the temperature within the tube a diluent gas such as nitrogen, hydrogen, helium and the like may be used.

As has been disclosed hereinabove, the use of the catalysts of this invention permits the attainment of space velocities which are much higher than those heretofore obtained in acetylene-hydrogen cyanide vapor phase catalytic reactions, and the high space velocities are obtained without adversely affecting the yield or conversion. For example, it has developed that space velocities from 500 to 2000 may be used effectively, and a space velocity of 1000 is especially preferred.

The acrylonitrile can be recovered from the gaseous reaction product in a number of different ways. For example, one preferred method consists in passing the reaction gases (which include the acrylonitrile) from the reactor tube into a scrubbing tower where the gases are scrubbed with an acidic material such as sodium acid sulfate or potassium acid sulfate to remove ammonia, succinonitrile and basic nitrogenous compounds such as pyridine and the like, which are compounds formed in small quantities by the reaction. The scrubbing tower is heated to drive off the acrylonitrile and unreacted hydrogen cyanide which are then collected and condensed in a series of cold traps and subsequently separated by distillation. A second method of recovering the acrylonitrile consists in absorption of the vapors in a petroleum fraction such as kerosene followed by fractionation of the enriched petroleum fraction to produce substantially pure acrylonitrile. Still other methods, such as compression and cooling of the effluent from the reactor tube after acid scrubbing to remove ammonia, followed by fractionation of the condensate to produce the acrylonitrile, or absorption of the acid-washed organic vapors in water, followed by fractionation of the solution thus formed to produce a two-phase azeotrope containing wet acrylonitrile, and drying the product, as well as other common methods of separation may be used. The unreacted acetylene and hydrogen cyanide may be recycled regardless of the method of separation used.

The catalyst retains its activity for extended periods of time and as a result it is possible to operate the process on a continuous basis for periods up to 100 hours or more without replacing the catalyst. However, because of the decrease in the production rate which occurs when a major portion of the alkali metal hydroxide is converted to the cyanide, as has been explained hereinabove, it is desirable to replace the catalyst after approximately 40 hours of use.

Replacement of the catalyst may be facilitated by the use of a fluid catalyst system. For example, the supported catalyst and catalyst promoter may be ground to a very fine particle size (preferably 40 to 100 microns), placed in the reactor tube and the acetylene and hydrogen cyanide passed in a vertical upward manner through the tube, whereupon a boiling or bubbling effect is obtained, giving an extremely large contact area of the gases with the catalyst and accordingly a high production rate of acrylonitrile. The acrylonitrile is separated from the effluent gases by any of the methods shown above.

The following specific examples, in which all parts are by weight unless otherwise designated, are intended to illustrate more fully the preparation of the supported catalyst and catalyst promoter of this invention and the use of the materials thus prepared for the vapor phase reaction of acetylene and hydrogen cyanide, but are not to be construed as a limitation upon the scope of the invention.

Example I 25 parts of dry unactivated hardwood charcoal (chicken charcoal) are thoroughly wet with a water solution of barium acetate in which the weight of barium is calculated as 1.25%. The resultant slurry is heated to the boiling point for 10 minutes and subsequently cooled to 30° C. and filtered with suction. 45.4 parts of the wet charcoal, containing 1.02% of barium, are obtained. The wet charcoal is dried for 18 hours at 120° C. yielding 25.3 parts of dry product.

The dried product is treated with an 8.9% solution of sodium hydroxide heated to approximately 100° C. for 10 minutes, cooled and filtered. The weight of charcoal increased to 50.1 parts and contained 8.8% by weight of sodium hydroxide (calculated on the wet take-up). After drying for 3 hours at 160° C. 27.4 parts of dried material are obtained.

13.2 parts of the product obtained by the above procedure are placed in a Pyrex glass tube. A mixture of gases in the ratio of 1.5 mole acetylene, 1 mole hydrogen cyanide and 0.5 mole nitrogen is preheated to 230° C. and then passed vertically downward for a period of 36 hours at a space velocity of 500 (cubic centimeters per hour per cubic centimeter of catalyst) through the catalyst, which is heated to an initial temperature of 535° C. and gradually increased to a final temperature of 665° C. The exit gases are passed through a scrubbing tower, where the small amounts of ammonia, together with succinonitrile and other high boiling by-products are removed by an aqueous solution of sodium acid sulfate. The acrylonitrile and unreacted hydrogen cyanide are recovered by condensation in a series of three cold traps and finally separated by distillation. The conversion of hydrogen cyanide to acrylonitrile is 95% and the yield 99% of the theoretical.

Examples II to VI

Example I is repeated except that in each example a different type of unactivated hardwood charcoal is used as the catalyst support. The production rate, conversion of hydrogen cyanide to acrylonitrile, and yield of acrylonitrile are shown in the following table:

| Example | Charcoal [1] | Production Rate Grams Acrylonitrile per hour per liter of supported catalyst | Percent Conversion on Hydrogen Cyanide | Percent Yield on Hydrogen Cyanide |
|---|---|---|---|---|
| II | #1 | 370 | 94 | 99 |
| III | #2 | 366 | 94 | 99 |
| IV | #3 | 310 | 84 | 95 |
| V | #4 | 370 | 94 | 99 |
| VI | #5 | 365 | 93 | 97 |

[1] Because of the widely varying sources of wood charcoals, it is not possible accurately to identify the particular type of wood from which the charcoal is obtained. However, in each of the examples the charcoal is from a different source, thus showing that the improved results are obtained with any of the various unactivated hardwood charcoals.

Examples VII to XIV

Examples VII to XIV show the effect of varying the percentage of barium used as a catalyst promoter and also the effect of varying the percentage of alkali metal hydroxide catalyst. In each example an unactivated hardwood charcoal support is used and the reaction is conducted as in Example I.

| Example | Percentage Barium | Percentage Alkali Metal Hydroxide | Production Rate Grams Acrylonitrile per Hour per Liter of Catalyst and Promoter | Percent Conversion on Hydrogen Cyanide | Percent Yield on Hydrogen Cyanide |
|---|---|---|---|---|---|
| VII | 0.5 | 8.0 | 346 | 88 | 97 |
| VIII | 1.0 | 8.0 | 350 | 89 | 97 |
| IX | 1.7 | 8.0 | 325 | 83 | 87 |
| X | 2.5 | 8.0 | 318 | 81 | 95 |
| XI | 3.8 | 8.0 | 246 | 63 | 90 |
| XII | 1.0 | 4.7 | 250 | 64 | 86 |
| XIII | 1.0 | 6.8 | 330 | 84 | 98 |
| XIV | 1.0 | 9.3 | 333 | 85 | 88 |

Example XV

A supported catalyst and catalyst promoter, containing 8.5% cesium hydroxide, 1% barium (in the form of barium chloride) and mounted on an unactivated hardwood charcoal support, are prepared as in Example I. The catalyst thus prepared is used in the synthesis of acrylonitrile by passing a gaseous mixture consisting of 2 moles of acetylene, one mole of hydrogen cyanide and 1 mole of nitrogen (as a diluent gas), preheated to 350° C. over the catalyst at a space velocity of 1000, the catalyst being placed in a stainless steel reactor tube which is heated to an initial temperature of 555° C. The reaction proceeded at a production rate of 352 grams/hour/liter of catalyst, which corresponds to a conversion of hydrogen cyanide to acrylonitrile of 90% and a yield of 97%. The catalyst retained its activity even after 60 hours of use.

Examples XVI to XVIII

Example I is repeated except that an activated charcoal support is used in Example XVI, an activated alumina support is used in Example XVII, and a diatomaceous earth support is used in Example XVIII. In each case the conversion of hydrogen cyanide to acrylonitrile, yield of acrylonitrile and production rate obtained are not as high as when an unactivated carbon support is used, but are much better than those obtained when other known catalysts are used for the same reaction. For example, the production rate obtained in Example XVI is 149 grams acrylonitrile per hour per liter of catalyst, in Example XVII, 67 grams of acrylonitrile per hour per liter of catalyst, and in Example XVIII, 170 grams acrylonitrile per hour per liter of catalyst, while the production rates obtained by utilizing a well-known contact-type catalyst supported on (1) activated charcoal, (2) activated alumina, and (3) diatomaceous earth under the same conditions employed in XVI to XVIII, are only 106, 21, and 28 respectively.

To illustrate the superior results obtained when a barium promoter is used, supported catalyst and catalyst promoters are prepared by impregnating unactivated charcoal supports with 8% by weight of sodium hydroxide and comparing the production rate, conversion and yield with those obtained in Examples I to XVI. The results are shown in the following table:

| Charcoal | Production Rate Grams per Hour per Liter of Supported Catalyst | Percent Conversion on Hydrogen Cyanide | Percent Yield on Hydrogen Cyanide |
|---|---|---|---|
| #1 | 206 | 53 | 57 |
| #2 | 200 | 51 | 56 |
| #3 | 260 | 70 | 74 |
| #4 | 224 | 57 | 63 |
| #5 | 234 | 60 | 66 |

It can be seen by comparison, therefore, that the use of a barium promoter results in production rates, conversions and yields which are much greater than those which have been obtained when other catalysts and catalyst combinations have been used for the reaction of acetylene and hydrogen cyanide.

Although specific examples of the invention have been herein described, it is not intended that the invention be limited solely thereto, for numerous variations and modifications will be apparent to those skilled in the art and are within the spirit and scope of the appended claims.

We claim:

1. A method for the preparation of acrylonitrile which comprises reacting acetylene with hydrogen cyanide in the vapor phase at a temperature of 500° to 675° C. and in the presence of a catalyst comprising an alkali metal hydroxide, and a catalyst promoter consisting of barium in the form of a barium compound, said catalyst and catalyst promoter being supported on an unactivated charcoal and being present in an amount such that the catalyst comprises from 6 to 10% and the barium comprises from 1 to 2% by weight of the charcoal support.

2. A method for the preparation of acrylonitrile which comprises reacting acetylene with hydrogen cyanide in the vapor phase at a temperature of 500° to 675° C. and in the presence of a catalyst comprising sodium hydroxide and a catalyst promoter consisting of barium applied in the form of a water-soluble barium compound, said catalyst and catalyst promoter being supported on an unactivated charcoal and being present in an amount such that the sodium hydroxide comprises from 6 to 10% and the barium comprises from 1 to 2% by weight of the charcoal support.

3. A method for the preparation of acrylonitrile which comprises reacting acetylene and hydrogen cyanide in the vapor phase at a temperature of 500° to 675° C. and in the presence of a catalyst comprising cesium hydroxide, and a catalyst promoter consisting of barium applied in the form of a water-soluble barium compound, said catalyst and catalyst promoter being supported on an unactivated charcoal and being present in an amount such that the cesium hydroxide comprises from 6 to 10% and the barium comprises from 1 to 2% by weight of the charcoal support.

4. A method for the preparation of acrylonitrile which comprises bringing together acetylene and hydrogen cyanide in a molal ratio of from 1.5 to 2.0 moles of acetylene to 1 mole of hydrogen cyanide at a temperature of 500° to 675° C. and in the presence of a catalyst comprising sodium hydroxide and a catalyst promoter consisting of barium applied in the form of barium acetate, said catalyst and catalyst promoter being supported on an unactivated charcoal and being present in an amount such that the sodium hydroxide comprises from 6 to 10% and the barium comprises from 1 to 2% by weight of the charcoal support.

5. A method for the preparation of acrylonitrile which comprises reacting acetylene with hydrogen cyanide in the vapor phase at a temperature of 500° to 675° C. and in the presence of a catalyst comprising an alkali metal hydroxide, and a catalyst promoter consisting of barium in the form of a barium compound, said catalyst and catalyst promoter being supported on an unactivated charcoal and being present in an amount such that the catalyst comprises from 6 to 10% and the barium comprises from 0.5 to 4.0% by weight of the charcoal support.

DAVID C. SPAULDING.
CHARLES E. BROCKWAY.

REFERENCES CITED

The following references are of record in the file of this patent:

UNITED STATES PATENTS

| Number | Name | Date |
|---|---|---|
| 2,419,186 | Harris et al. | Apr. 15, 1947 |
| 2,433,182 | Wolk | Dec. 23, 1947 |